United States Patent [19]

Lamm et al.

[11] 4,285,693

[45] Aug. 25, 1981

[54] DYEING OF SURFACE COATINGS, ORGANIC SOLVENTS AND PETROLEUM PRODUCTS

[75] Inventors: Guenther Lamm, Hassloch; Johannes Dehnert, Ludwigshafen, both of Fed. Rep. of Germany

[73] Assignee: BASF Aktiengesellschaft, Fed. Rep. of Germany

[21] Appl. No.: 138,405

[22] Filed: Apr. 8, 1980

[30] Foreign Application Priority Data

Apr. 27, 1979 [DE] Fed. Rep. of Germany ....... 2917063

[51] Int. Cl.³ .............................................. D06P 3/00
[52] U.S. Cl. ......................................... 8/521; 8/694; 8/938
[58] Field of Search ............................ 8/521, 694, 938

[56] References Cited

U.S. PATENT DOCUMENTS 4,134,723  1/1979  Boyd et al. ................ 8/532

FOREIGN PATENT DOCUMENTS 2216207  10/1972  Fed. Rep. of Germany .
1360635   7/1974  United Kingdom .

Primary Examiner—A. Lionel Clingman
Attorney, Agent, or Firm—Oblon, Fischer, Spivak, McClelland & Maier

[57] ABSTRACT

A process for dyeing surface coatings, organic solvents and petroleum products, wherein the dye used is a compound of the general formula I

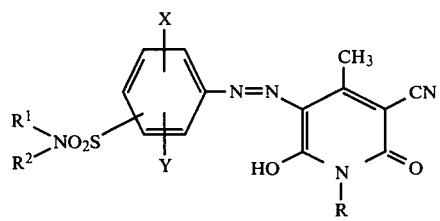

where
R is $C_1$–$C_{17}$-alkyl, which may or may not be interrupted by oxygen and may or may not be substituted by hydroxyl or phenoxy, or is allyl,
$R^1$ is hydrogen or $C_1$–$C_8$-alkyl,
$R^2$ is $C_1$–$C_{12}$-alkyl which may or may not be interrupted by oxygen and may or may not be substituted by hydroxyl or phenoxy, or is $C_7$–$C_{11}$-aralkyl,
X is hydrogen, chlorine, bromine, methyl or methoxy,
Y is hydrogen, methyl or chlorine and
$R^1$ and $R^2$ may also together be the radical

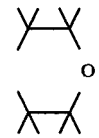

3 Claims, No Drawings

DYEING OF SURFACE COATINGS, ORGANIC SOLVENTS AND PETROLEUM PRODUCTS

The present invention relates to a process for dyeing surface coatings, organic solvents and petroleum products, wherein the dye used is a compound of the general formula I

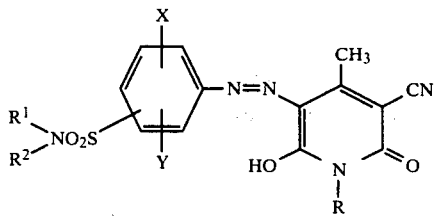

where
R is $C_1$–$C_{17}$-alkyl, which may or may not be interrupted by oxygen and may or may not be substituted by hydroxyl or phenoxy, or is allyl,
$R^1$ is hydrogen or $C_1$–$C_8$-alkyl,
$R^2$ is $C_1$–$C_{12}$-alkyl which may or may not be interrupted by oxygen and may or may not be substituted by hydroxyl or phenoxy, or is $C_7$–$C_{11}$-aralkyl,
X is hydrogen, chlorine, bromine, methyl or methoxy,
Y is hydrogen, methyl or chlorine and
$R^1$ and $R^2$ may also together be the radical

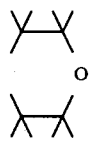

Specific examples of alkyl radicals R are $CH_3$, $C_2H_5$, β-ethylhexyl, n- and i-propyl, -butyl, -pentyl, -hexyl, -heptyl and -octyl. n-Butyl is particularly preferred.

Oxygen-containing radicals R are in particular those of the general formula

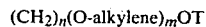

$(CH_2)_n$(O-alkylene)$_m$OT where
m is 1, 2, 3 or 4,
n is 2 or 3,
T is hydrogen, $C_1$–$C_4$-alkyl, cyclohexyl, benzyl, phenylethyl, phenyl or tolyl and alkylene is

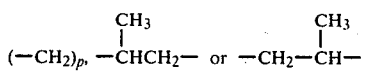

$(-CH_2)_p$, $-\overset{CH_3}{\underset{|}{C}}HCH_2-$ or $-CH_2-\overset{CH_3}{\underset{|}{C}}H-$ where p is 2, 4 or 6.

Specific examples of such radicals are $C_2H_4OC_2H_4OH$, $(CH_2)_3O(CH_2)_4OH$, $(CH_2)_3O(CH_2)_6OH$, $(CH_2)_3(OC_2H_4)_mOCH_3$, $(CH_2)_3(OC_2H_4)_mOC_2H_5$, $(CH_2)_3(OC_2H_4)_mOC_3H_7$, $(CH_2)_3(OC_2H_4)_mOC_4H_9$, $(CH_2)_3OC_2H_4OC_6H_5$ and $(CH_2)_3(OC_3H_6)_mOCH_3$, where $C_3H_7$ and $C_4H_9$ may be the n-radicals or i-radicals.

Examples of $R^1$ and $R^2$, within the limits given, are the same radicals as well as nonyl, decyl, undecyl and dodecyl, and—for the case where $R^2$ is aralkyl-benzyl, phenylethyl, phenylpropyl, phenylbutyl, phenylpentyl, tolylethyl, tolylpropyl and tolylbutyl.

Preferred meanings of $R^1$ and $R^2$ are hydrogen for one radical and $C_7$–$C_{10}$ alkyl for the other radical. Preferred oxygen-containing radicals R und $R^2$ are those which have been mentioned individually.

Compounds of particular importance for the process according to the invention are those of the formula Ia

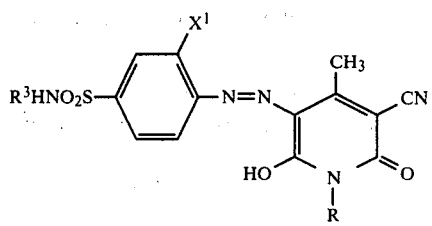

where
$R^3$ is $C_7$–$C_9$-alkyl or one of the oxygen-containing radicals which have been mentioned individually,
$X^1$ is hydrogen or methyl and
R has the stated meanings.

The compounds of the formula I are prepared in a conventional manner by diazotizing an amine of the general formula II

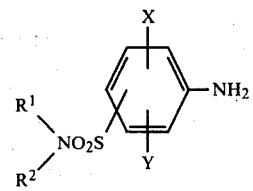

and coupling it to a pyridone derivative of the formula III

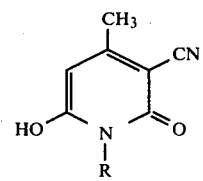

Some of the compounds of the formula I are known as disperse dyes, in particular for dyeing polyester fibers.

It has now been found, surprisingly, that the compounds of the formula I are also suitable for dyeing surface coatings, organic solvents and mineral oil products, because they possess an unexpectedly high solubility in these media. Specific examples of substrates which can be dyed with the compounds of the formula I are printing inks based on aromatic hydrocarbons, eg. toluene or xylenes, or on esters, ketones, glycols, glycol-ethers and alcohols, eg. ethyl acetate, butyl acetate, methoxyethyl acetate, acetone, methyl ethyl ketone, methylglycol, methyldiglycol, butyldiglycol, ethanol, propanol, butanol, butyl phthalate or ethylhexyl phthalate, writing inks, transparent finishes for flexographic printing, heating oils, diesel oils, and organic solvents in general.

For use in conjunction with oxygen-containing solvents, the compounds of the formula I in which the radicals R and $R^2$ contain oxygen are particularly In printing inks, the compounds of the formula I can replace the conventionally used pigments; this offers great advantages in that the finishing operations required for pigments, and the process of dispersing the pigment, are saved. The fastness characteristics achievable are of a similar level to those obtained with the conventional pigments.

In the Examples which follow, parts and percentages are by weight, unless stated otherwise.

EXAMPLE 1

14.9 parts of the diazo component of the formula

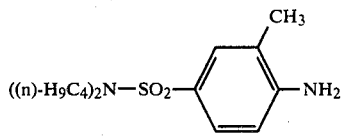

are dissolved in 60 parts by volume of dimethylformamide. 2 parts of turkey red oil are then added and the mixture is diluted with 18 parts by volume of concentrated hydrochloric acid, 200 parts by volume of water and 100 parts of ice. After having added 16.5 parts by volume of a 23% strength sodium nitrite solution, the mixture is stirred for 2 hours at 0°–8° C., excess nitrous acid is then destroyed with amidosulfonic acid, and the diazonium salt mixture is buffered to pH 4.5 by adding sodium acetate. A solution of 12.8 parts of 1-(n)-butyl-2-hydroxy-3-cyano-4-methylpyrid-6-one in 200 parts by volume of water and 5 parts of 50% strength sodium hydroxide solution is then run into the mixture.

Coupling is rapidly completed at pH 4.5–5.0.

The yellow dye which has precipitated is isolated in a conventional manner, washed salt-free with water, and dried. 27 parts of a yellow powder of the formula

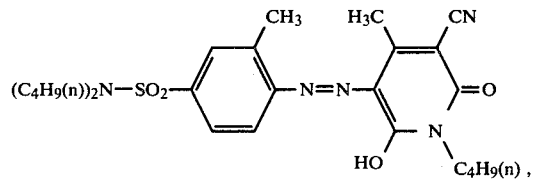

are obtained; the product gives a yellow solution in toluene, ethyl alcohol and methyl ethyl ketone.

0.6 part of the dye is dissolved in a mixture of 15 parts of collodion cotton, 8 parts of n-butanol, 4 parts of ethylhexyl phthalate, 4 parts of dibutyl phthalate, 35 parts of ethylglycol and 34 parts of toluene, and white paper is printed with the solution obtained. A yellow print is obtained after drying.

The dyes characterized by their substituents in the Tables which follow can be used likewise in the manner described above.

EXAMPLE 2

5 parts of the yellow dye of the formula

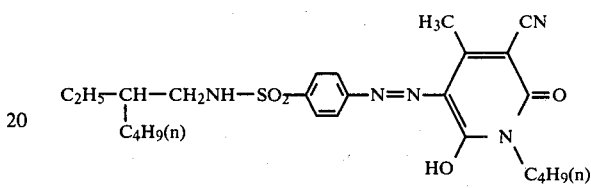

are dissolved in a mixture of 85 parts of toluene and 10 parts of a styrene/maleic acid ester resin. The resulting mixture may be used as an ink for felt pens.

EXAMPLE 3

5 parts of the dye mentioned in Example 2 are dissolved in a mixture of 10 parts of a styrene/maleic acid ester resin (which acts as a binder), 65 parts of ethanol, 10 parts of propanol and 10 parts of ethylglycol. This gives an alcohol-based yellow ink for writing utensils.

EXAMPLE 4

6 parts of the dye mentioned in Example 2 are dissolved in a mixture of 37 parts of ethyl acetate, 37 parts of methyl ethyl ketone and 20 parts of a vinyl chloride/vinyl acetate copolymer (which serves as the binder). A yellow finish is obtained, which gives greenish yellow coatings on aluminum foil.

EXAMPLE 5

20 parts of the dye mentioned in Example 2 are dissolved in 80 parts of toluene. The concentrated yellowish brown solution is then run into 4,000,000 parts of heating oil, with thorough stirring. This provides a greenish yellow identification of the oil.

TABLE 1

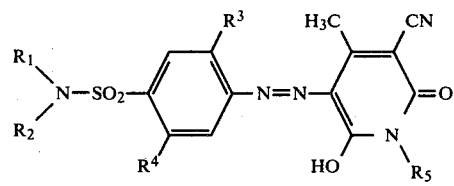

| Example | $R_1$ | $R_2$ | $R_3$ | $R_4$ | $R_5$ | Hue |
|---|---|---|---|---|---|---|
| 6 | H | $(CH_3)_2-CH(CH_2)_2-CH- \\ \phantom{xxxxxxxx}| \\ \phantom{xxxxxxxx}CH_3$ | H | H | $C_4H_9(n)$ | greenish yellow |
| 7 | " | " | $CH_3$ | " | " | yellow |
| 8 | " | " | " | $CH_3$ | " | " |
| 9 | " | $CH_3(CH_2)_3-CH-CH_2CH_3 \\ \phantom{xxxxxxxxxxx}|$ | " | H | " | " |

TABLE 1-continued

[Structure: R1R2N-SO2-[benzene with R3, R4]-N=N-[pyridone with H3C, CN, =O, HO, N-R5]]

| Example | R1 | R2 | R3 | R4 | R5 | Hue |
|---|---|---|---|---|---|---|
| 10 | " | CH$_3$(CH$_2$)$_2$—CH—(CH$_2$)$_2$CH$_3$ | " | " | " | " |
| 11 | " | " | H | " | " | greenish yellow |
| 12 | " | (CH$_3$)$_2$CH—CH—CH(CH$_3$)$_2$ | " | " | " | " |
| 13 | " | CH$_3$—(CH$_2$)$_7$— | " | " | " | " |
| 14 | " | " | CH$_3$ | " | " | yellow |
| 15 | " | " | " | CH$_3$ | " | " |
| 16 | " | " | H | " | " | " |
| 17 | " | " | " | " | C$_3$H$_7$(n) | " |
| 18 | " | " | CH$_3$ | " | C$_2$H$_5$ | " |
| 19 | " | " | " | " | C$_4$H$_9$(i) | " |
| 20 | " | " | " | H | C$_6$H$_{13}$(n) | " |
| 21 | " | " | " | " | CH$_2$CH=CH$_2$ | " |
| 22 | " | " | H | " | " | greenish yellow |
| 23 | " | CH$_3$(CH$_2$)$_3$CH—CH$_2$—<br>                         C$_2$H$_5$ | " | " | " | " |
| 24 | " | " | CH$_3$ | " | " | yellow |
| 25 | " | " | " | CH$_3$ | " | " |
| 26 | CH$_3$(CH$_2$)$_3$— | CH$_3$(CH$_2$)$_3$— | " | " | " | " |
| 27 | H | CH$_3$(CH$_2$)$_3$—CH—CH$_2$—<br>                         C$_2$H$_5$ | H | CH$_3$ | " | " |
| 28 | " | " | " | " | C$_3$H$_7$(n) | " |
| 29 | " | " | C$_2$H$_5$ | H | " | " |
| 30 | " | " | " | " | C$_4$H$_9$(n) | " |
| 31 | " | " | CH$_3$ | " | " | " |
| 32 | " | (CH$_3$)$_2$CH—(CH$_2$)$_3$CH—CH$_3$ | " | " | " | " |
| 33 | " | (CH$_3$)$_2$CH—(CH$_2$)$_3$CH—CH$_3$ | " | CH$_3$ | " | " |
| 34 | " | " | H | " | " | " |
| 35 | " | " | CH$_3$ | " | C$_3$H$_7$(i) | " |
| 36 | " | CH$_3$—(CH$_2$)$_9$— | " | H | " | " |
| 37 | " | " | " | " | CH$_2$—CH=CH$_2$ | " |
| 38 | " | " | H | " | C$_3$H$_7$(i) | greensih yellow |
| 39 | " | " | " | " | C$_4$H$_9$(n) | " |
| 40 | " | " | " | " | C$_4$H$_9$(i) | " |
| 41 | " | CH$_3$—(CH$_2$)$_{11}$— | " | " | C$_4$H$_9$(n) | " |
| 42 | " | " | " | " | C$_3$H$_9$(n) | " |
| 43 | " | " | " | " | C$_6$H$_{13}$(n) | " |
| | | [Ph]—CH—CH$_2$—<br>        CH$_3$ | | | | |
| 44 | " | " | CH$_3$ | " | " | yellow |
| 45 | " | " | " | " | C$_4$H$_9$(n) | " |
| 46 | " | [Ph]—CH$_2$—CH$_2$—CH—<br>                        CH$_3$ | " | " | " | " |
| 47 | " | " | H | " | " | " |
| 48 | (CH$_2$)$_3$CH$_3$ | CH$_3$(CH$_2$)$_3$CH—CH$_2$—<br>                         C$_2$H$_5$ | CH$_3$ | CH$_3$ | " | " |
| 49 | " | " | " | " | CH$_2$—CH=CH$_2$ | " |
| 50 | CH$_3$ | " | H | H | C$_4$H$_9$(n) | " |
| 51 | " | CH$_3$(CH$_2$)$_7$— | " | " | " | " |
| 52 | CH$_3$(CH$_2$)$_5$— | CH$_3$(CH$_2$)$_5$— | " | " | " | " |

TABLE 2

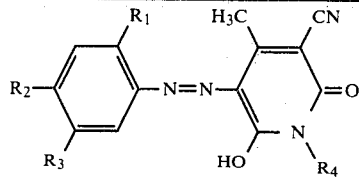

| Example | R₁ | R₂ | R₃ | R₄ | Hue |
|---|---|---|---|---|---|
| 53 | Cl | SO₂NH—CH₂CH(C₂H₅)—C₄H₉(n) | H | C₄H₉(n) | yellow |
| 54 | CH₃ | " | Cl | " | " |
| 55 | Cl | " | " | " | " |
| 56 | Cl | " | " | C₆H₁₃(n) | " |
| 57 | Br | " | H | C₄H₉(n) | " |
| 58 | Br | " | H | C₃H₇(n) | " |
| 59 | Br | " | " | CH₂CH=CH₂ | " |
| 60 | Cl | " | " | " | " |
| 61 | CH₃ | " | Cl | " | " |
| 62 | H | H | SO₂NH—CH₂—CHC₄H₉(n)(C₂H₅) | " | greenish yellow |
| 63 | Cl | " | " | " | " |
| 64 | " | " | SO₂NH—(CH₂)₁₁CH₃ | " | " |
| 65 | " | " | " | C₄H₉(n) | " |
| 66 | H | " | " | " | " |
| 67 | " | " | SO₂NH(CH₂)₉CH₃ | " | " |
| 68 | " | " | SO₂NH—CH₂CH(CH₃)—C₆H₅ | " | " |
| 69 | " | " | " | CH₂—CH=CH₂ | " |
| 70 | " | " | SO₂N(C₄H₉)₂ | " | " |
| 71 | " | " | " | C₄H₉(n) | " |
| 72 | H | SO₂N(C₄H₉(n))₂ | H | CH₂CH(C₂H₅)—C₄H₉(n) | " |
| 73 | OCH₃ | SO₂NH—CH₂CH(C₄H₉(n))—C₂H₅ | H | C₄H₉(n) | yellow |
| 74 | NO₂ | " | " | " | " |
| 75 | " | " | " | C₂H₅ | " |
| 76 | " | SO₂NH—C₆H₁₃(n) | " | C₄H₉(n) | " |
| 77 | " | SO₂NH—C₄H₉(n) | " | " | " |

The dyes listed in the Table which follows are particularly suitable for the preparation of alcoholic print pastes.

TABLE 3

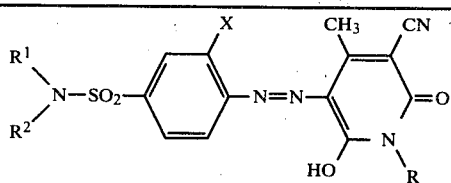

| Example | R¹ | R² | X | R | Hue |
|---|---|---|---|---|---|
| 78 | H | HOC₆H₁₂OC₃H₆— | H | CH₂CH₂OH | yellow |
| 79 | " | " | " | C₃H₆OH | " |
| 80 | " | " | " | CH₂CH₂OCH₂CH₂OH | " |
| 81 | " | " | " | (CH₂)₂OCH₃ | " |
| 82 | " | " | " | (CH₂)₃OCH₃ | " |
| 83 | " | " | " | (CH₂)₃O(CH₂)₄OH | " |
| 84 | CH₃OCH₂CH₂ | CH₃OCH₂CH₂ | " | " | " |
| 85 | " | " | " | (CH₂)₂O(CH₂)₄OH | " |
| 86 | H | " | CH₃ | " | " |
| 87 | " | " | " | (CH₂)₃O(CH₂)₄OH | " |
| 88 | " | CH₃OCH₂CH₂CH₂ | " | " | " |
| 89 | " | " | H | " | " |
| 90 | " | CH₃(OCH₂CH₂)₂O(CH₂)₃ | " | " | " |
| 91 | " | CH₃(OCH₂CH₂)₃O(CH₂)₃ | " | " | " |
| 92 | " | C₂H₅OCH₂CH₂O(CH₂)₃ | " | " | " |
| 93 | " | C₂H₅(OCH₂CH₂)₂O(CH₂)₃ | " | " | " |
| 94 | " | " | CH₃ | " | " |
| 95 | " | C₄H₉(OCH₂CH₂)₂O(CH₂)₃ | H | " | " |

TABLE 3-continued

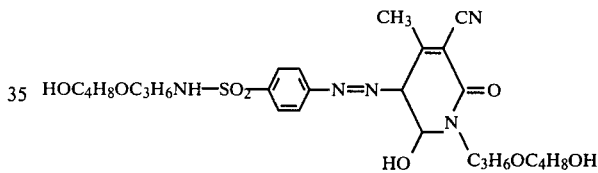

| Example | R¹ | R² | X | R | Hue |
|---------|-----|-----|-----|-----|-----|
| 96 | " | 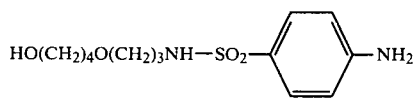—OCH₂CH₂OCH₂CH₂CH₂ | " | " | " |
| 97 | " | CH₃(OCH₂CH₂)₂O(CH₂)₃ | " | (CH₂)₃O(CH₂)₂O—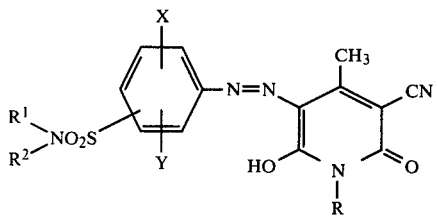 | " |
| 98 | " | CH₃OCH₂CH₂CH₂ | CH₃ | (CH₂)₃OCH₂CH₂OCH₃ | " |
| 99 | " | " | " | (CH₂)₃(OCH₂CH₂)₂OCH₃ | " |
| 100 | " | " | H | " | " |
| 101 | " | CH₃(OCH₂CH₂)₂O(CH₂)₃ | " | " | " |
| 102 | " | HOCH₂CH₂CH₂ | CH₃ | " | " |
| 103 | " | C₄H₉O(CH₂)₃ | H | " | " |
| 104 | " | C₂H₅OCH₂CH₂O(CH₂)₃ | " | " | " |
| 105 | " | HO(CH₂)₄O(CH₂)₃ | " | " | " |
| 106 | " | " | CH₃ | " | " |
| 107 | " | " | " | (CH₂)₃(OCH₂CH₂)₂OC₂H₅ | " |
| 108 | " | " | H | (CH₂)₃(OCH₂CH₂)₂OC₂H₅ | " |
| 109 | " | " | " | (CH₂)₃(OCH₂CH₂)₂OC₄H₉ | " |
| 110 | C₂H₅ | C₂H₅ | " | (CH₂)₃(OCH₂CH₂)₂OCH₃ | " |
| 111 | " | " | " | (CH₂)₃O(C₃H₆O)₂CH₃ | " |
| 112 | H | H₃COC₃H₆ | " | (CH₂)₃(C₃H₆O)₄CH₃ | " |
| 113 | " | CH₃O(C₃H₆O)₂(CH₂)₃ | " | C₃H₆OCH₃ | " |
| 114 | " | C₂H₅OC₃H₆O(CH₂)₃ | " | " | " |

EXAMPLE 115

30.2 parts of the diazo component of the formula

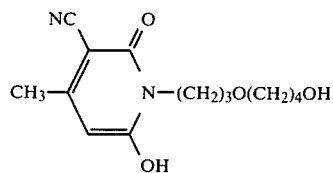

are dissolved in 100 parts by volume of water and 36 parts by volume of concentrated hydrochloric acid. The mixture is then cooled to 0°–5° C. by adding 150 parts of ice and 33 parts of a 23 percent strength sodium nitrite solution are added whilst stirring. The mixture is stirred for a further 80 minutes at 5°–12° C., excess nitrous acid is then destroyed in a conventional manner, and the diazonium salt mixture is added to a stirred solution of 28 parts of the coupling component of the formula NC    O
CH₃—⟨ring⟩—N—(CH₂)₃O(CH₂)₄OH
      OH in a mixture of 300 parts of water and 15 parts of sodium formate. The coupling suspension is then buffered to pH 4.5–5.5. The coupling reaction rapidly goes to completion. The mixture is stirred for a further hour and the dye of the formula HOC₄H₈OC₃H₆NH—SO₂—⟨ring⟩—N=N—⟨pyridone with CH₃, CN, =O, HO, N-C₃H₆OC₄H₈OH⟩ which has precipitated as an oil is allowed to settle out.

The upper, aqueous phase is decanted and the oil is then repeatedly washed with water. 58 parts of a yellow dye are thus obtained in the form of a viscous oil. On diluting the oil with 60 parts of isopropanol, a yellow solution of the dye is obtained which can be used to dye paper in strong yellow hues.

We claim:

1. A process for dyeing surface coatings, organic-solvents and petroleum products, wherein the dye used is a compound of the formula I:

$$\text{R}^1\text{R}^2\text{NO}_2\text{S}-\underset{Y}{\overset{X}{\text{C}_6\text{H}_3}}-N=N-\text{pyridone}(CH_3, CN, HO, =O, N-R)$$

where R is C₁–C₁₇-alkyl, which may or may not be interrupted by oxygen and may or may not be substituted by hydroxyl or phenoxy, or is allyl, R¹ is hydrogen or C₁–C₈-alkyl, R² is C₇–C₁₂-alkyl, C₇–C₁₂-alkyl interrupted by oxygen and optionally substituted by hydroxy or phenoxy, or is C₇–C₁₁-aralkyl, X is hydrogen, chlorine, methyl or methoxy, and Y is hydrogen or methyl.

2. A process as claimed in claim 1, wherein the dye used is a compound of the formula

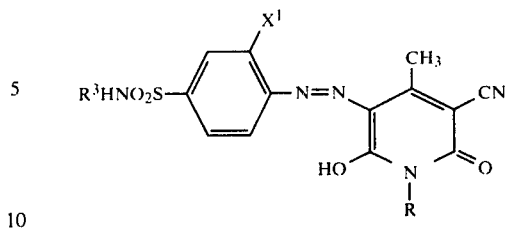

where
R$^3$ is C$_7$–C$_9$-alkyl,
X$^1$ is hydrogen or methyl and
R has the stated meanings.

3. The process of claim 1 wherein R$^1$ is hydrogen or i-octyl;
R$^2$ is C$_7$–C$_{12}$-alkyl or C$_7$–C$_{12}$-alkyl interrupted by oxygen and optionally substituted by hydroxy or phenoxy;
X is hydrogen or methyl; and
Y is hydrogen.

* * * * *